US008538750B2

(12) United States Patent
Aoyama et al.

(10) Patent No.: US 8,538,750 B2
(45) Date of Patent: *Sep. 17, 2013

(54) SPEECH COMMUNICATION SYSTEM AND METHOD, AND ROBOT APPARATUS

(71) Applicant: Sony Corporation, Minato-ku (JP)

(72) Inventors: Kazumi Aoyama, Saitama (JP); Hideki Shimomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/667,978

(22) Filed: Nov. 2, 2012

(65) Prior Publication Data

US 2013/0060566 A1   Mar. 7, 2013

Related U.S. Application Data

(63) Continuation of application No. 13/473,272, filed on May 16, 2012, now Pat. No. 8,321,221, which is a continuation of application No. 10/882,360, filed on Jul. 2, 2004, now Pat. No. 8,209,179.

(30) Foreign Application Priority Data

Jul. 3, 2003   (JP) ................................. 2003-270835

(51) Int. Cl.
*G10L 15/00*   (2013.01)

(52) U.S. Cl.
USPC ........... 704/231; 704/275; 704/270; 704/206; 702/153; 702/188; 701/301; 700/245; 700/27; 382/118; 382/103; 382/107; 318/567

(58) Field of Classification Search
USPC ................. 704/276, 275, 270, 206; 702/188, 702/153; 701/301; 700/257, 245; 382/118, 382/107, 103; 318/567
See application file for complete search history.

(56) References Cited

U.S. PATENT DOCUMENTS

| 5,109,425 A | * | 4/1992 | Lawton | 382/107 |
|---|---|---|---|---|
| 5,227,985 A | * | 7/1993 | DeMenthon | 702/153 |

(Continued)

FOREIGN PATENT DOCUMENTS

| JP | 2000-326274 | 11/2000 |
|---|---|---|
| JP | 2001-129777 | 5/2001 |

(Continued)

OTHER PUBLICATIONS

Eliana P. L. Aude, et al. "CONTROLAB: An Integrated System for Intelligent Control of a Robot Arm", IEEE International Conference on Robotics and Automation, vol. 1, XP-000659683, May 21, 1995, pp. 268-274.

(Continued)

*Primary Examiner* — Michael Colucci
(74) *Attorney, Agent, or Firm* — Oblon, Spivak, McClelland, Maier & Neustadt, L.L.P.

(57) ABSTRACT

This invention realizes a speech communication system and method, and a robot apparatus capable of significantly improving entertainment property. A speech communication system with a function to make conversation with a conversation partner is provided with a speech recognition means for recognizing speech of the conversation partner, a conversation control means for controlling conversation with the conversation partner based on the recognition result of the speech recognition means, an image recognition means for recognizing the face of the conversation partner, and a tracking control means for tracing the existence of the conversation partner based on one or both of the recognition result of the image recognition means and the recognition result of the speech recognition means. The conversation control means controls conversation so as to continue depending on tracking of the tracking control means.

45 Claims, 8 Drawing Sheets

(56) References Cited

U.S. PATENT DOCUMENTS

| | | | |
|---|---|---|---|
| 5,323,470 A * | 6/1994 | Kara et al. | 382/103 |
| 6,009,396 A * | 12/1999 | Nagata | 704/270 |
| 6,219,645 B1 * | 4/2001 | Byers | 704/275 |
| 6,347,261 B1 * | 2/2002 | Sakaue et al. | 700/245 |
| 6,370,475 B1 * | 4/2002 | Breed et al. | 701/301 |
| 6,509,707 B2 * | 1/2003 | Yamashita et al. | 318/567 |
| 6,714,840 B2 | 3/2004 | Sakaue et al. | |
| 6,850,818 B2 * | 2/2005 | Sabe et al. | 700/257 |
| 6,907,388 B2 * | 6/2005 | Suzuki et al. | 702/188 |
| 7,047,105 B2 * | 5/2006 | Kakutani et al. | 700/245 |
| 7,076,430 B1 * | 7/2006 | Cosatto et al. | 704/275 |
| 7,113,848 B2 | 9/2006 | Hanson | |
| 7,216,082 B2 * | 5/2007 | Okubo et al. | 704/275 |
| 7,617,094 B2 * | 11/2009 | Aoki et al. | 704/206 |
| 7,813,835 B2 * | 10/2010 | Fujita et al. | 700/245 |
| 2001/0020837 A1 * | 9/2001 | Yamashita et al. | 318/567 |
| 2001/0021909 A1 * | 9/2001 | Shimomura et al. | 704/275 |
| 2002/0103575 A1 * | 8/2002 | Sugawara | 700/245 |
| 2002/0123826 A1 * | 9/2002 | Toki | 700/245 |
| 2003/0059092 A1 * | 3/2003 | Okubo et al. | 382/118 |
| 2003/0130851 A1 * | 7/2003 | Nakakita et al. | 704/275 |
| 2003/0220796 A1 * | 11/2003 | Aoyama et al. | 704/275 |
| 2003/0229474 A1 * | 12/2003 | Suzuki et al. | 702/188 |
| 2004/0117063 A1 * | 6/2004 | Sabe et al. | 700/245 |
| 2004/0267536 A1 * | 12/2004 | Hershey et al. | 704/276 |

FOREIGN PATENT DOCUMENTS

| | | |
|---|---|---|
| JP | 2001-188782 | 7/2001 |
| JP | 2001-300148 | 10/2001 |
| JP | 2002-116795 | 4/2002 |
| JP | 2002-264053 | 9/2002 |
| JP | 2003-62777 | 3/2003 |
| WO | WO 03/035334 A1 | 5/2003 |

OTHER PUBLICATIONS

Yoshiaki Sakagami, et al., "The Intelligent ASIMO: System overview and integration", Proceecings of the 2002 IEEE/RSJ Intl. Conference on Intelligent Robots and Systems, vol. 1 of 3, XP-010609464, Sep. 30, 2002, pp. 2478-2483.

* cited by examiner

| ID | Name | | Kind | | FaceID | SpeakerID | BIRTHDAY | | Favorite | | Friend | |
|---|---|---|---|---|---|---|---|---|---|---|---|---|
| 1 | YUKIKO | 3 | HUMAN | 2 | 0 | 1 | 73/5/2 | 2 | TEA | 3 | KAZUMI | 2 |
| 2 | KAZUMI | 1 | HUMAN | 2 | 3 | 4 | 75/8/16 | 5 | HORSE | 3 | TARO | 5 |
| 3 | SUZUKI | 5 | HUMAN | 2 | 6 | 8 | 74/3/10 | 2 | TEA | 3 | TARO | 2 |
| 4 | TEA | 2 | DRINK | 2 | 4 | | | | | | | |
| 5 | ICE CREAM | 4 | FOOD | 3 | 5 | | | | | | | |
| 6 | TARO | 2 | HUMAN | 3 | 8 | 9 | 76/10/10 | 4 | HORSE RACE | 3 | SUZUKI | 3 |

FIG. 4

SPEECH COMMUNICATION SYSTEM AND METHOD, AND ROBOT APPARATUS

CROSS-REFERENCE TO RELATED APPLICATION

This application is a continuation application of, and claims the benefit of priority under 35 U.S.C. §120 from, U.S. application Ser. No. 13/473,272, filed May 16, 2012, herein incorporated by reference, which is a continuation application of U.S. Pat. No. 8,209,179, issued Jun. 26, 2012, herein incorporated by reference, which claims the benefit of priority under 35 U.S. §119 from Japanese Patent Application No. 2003-270835, filed Jul. 3, 2003.

BACKGROUND OF THE INVENTION

1. Field of the Invention

This invention relates to a speech communication system and method, and a robot apparatus and, in particular, is suitably applied to an entertainment robot, for example.

2. Description of the Related Art

Recently, various kinds of entertainment robots for general users have been produced. Some entertainment robots are provided with various external sensors such as charge coupled device (CCD) cameras and microphones, so as to recognize surrounding conditions based on outputs of the external sensors to autonomously behave based on the recognition results.

Further, some of those entertainment robots being proposed are provided with a face recognition function to extract a human face in a captured image and identify a specified person while tracking the face or a speech communication function to make conversation with a user, like humans usually do. (for example, refer to Japanese Patent Application Laid-Open 2003-062777 (second to third sections, FIG. 1))

By the way, such an entertainment robot has to always confirm that a conversation partner is there while having conversation and to determine whether the robot is now having conversation with him/her.

In a dark place, the robot cannot recognize the conversation partner's face color and outline clearly, resulting in insufficient recognition of the face recognition function. In this case, the robot may determine that the partner is not there and stop the conversation although the partner is in front of the robot.

Further, in a situation where television or radio is turned on during conversation, since the speech communication function cannot distinguish between the television or radio and the conversation partner's voice, the robot may keep speaking even when the partner does not speak to the robot.

Therefore, if the robot can surely recognize the existence of a conversation partner under any environments, the robot can behave naturally like a human, so that the robot can have significantly improved entertainment property as an entertainment robot. This is strongly desired.

SUMMARY OF THE INVENTION

In view of the foregoing, an object of this invention is to provide a speech communication system and method, and a robot apparatus capable of significantly improving entertainment property.

The foregoing objects and other objects of the invention have been achieved by the provision of a speech communication system having a function to make conversation with a conversation partner. This system comprises: a speech recognition means for recognizing conversation partner's speech; a conversation control means for controlling conversation with the conversation partner depending on the recognition result of the speech recognition means; an image recognition means for recognizing the conversation partner's face; and a tracking control means for tracking the existence of the conversation partner based on one or both of the recognition result of the image recognition means and the recognition result of the speech recognition means. The conversation control means continues the conversation in keeping with the tracking of the tracking control means.

As a result, with this speech communication system, the existence of the conversation partner is comprehensively determined based on the recognition results of various recognition processes by having conversation with the conversation partner while tracking the existence of the conversation partner. Therefore, the existence of the conversation partner can be surely recognized without being affected by current environments, resulting in making natural conversation like humans do. Thus a speech communication system capable of significantly improving entertainment property can be realized.

Further, this invention proposes a speech communication method with a function to have conversation with a conversation partner. This speech communication method comprises: a first step of tracking the existence of the conversation partner based on one or both of a speech recognition result obtained by recognizing conversation partner's speech and an image recognition result obtained by recognizing the conversation partner's face; and a second step of continuing the conversation with the conversation partner determined based on the speech recognition result, in keeping with the tracking.

As a result, with this speech communication method, the existence of the conversation partner is comprehensively determined based on the recognition results of the various recognition processes by having conversation with the conversation partner while tracking the existence of the conversation partner. Therefore, the existence of the partner can be surely recognized without being affected by current environments, resulting in making natural conversation like humans do. Thus a speech communication method capable of significantly improving entertainment property can be realized.

Furthermore, this invention proposes a robot apparatus containing a speech communication system with a function to have conversation with a conversation partner. This robot apparatus comprises: a speech recognition means for recognizing conversation partner's speech; a conversation control means for controlling conversation with the conversation partner based on the recognition result of the speech recognition means; an image recognition means for recognizing the conversation partner's face; and a tracking control means for tracking the existence of the conversation partner based on one or both of the recognition result of the image recognition means and the recognition result of the speech recognition means. The conversation control means continues the conversation in keeping with the tracking of the tracking control means.

As a result, this robot apparatus comprehensively determines the existence of the conversation partner based on the recognition results of the various recognition processes by having conversation with the conversation partner while tracking the existence of the conversation partner. Therefore, the robot apparatus is able to surely recognize the existence of the conversation partner without being affected by current environments, which results in making natural conversation like human beings do. Thus a robot apparatus capable of significantly improving entertainment property can be realized.

BRIEF DESCRIPTION OF THE DRAWINGS

In the accompanying drawings:

FIG. 4 is a conceptual view explaining a recording format of obtained information;

DETAILED DESCRIPTION OF THE EMBODIMENT

Preferred embodiments of this invention will be described with reference to the accompanying drawings:

(1) Construction of the Robot 1 According to this Embodiment (1-1) Hardware Structure of the Robot 1

Figure 1:
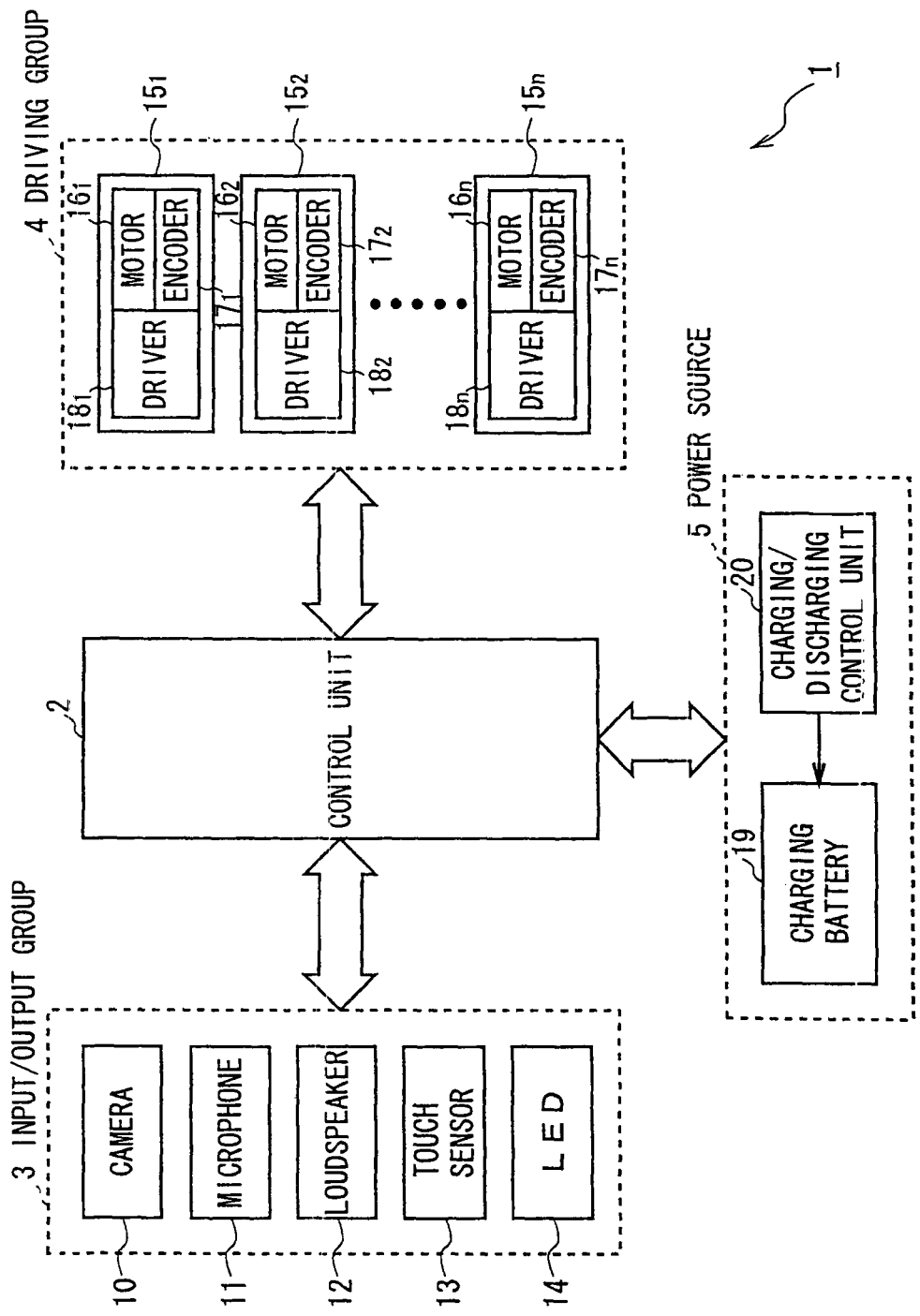
FIG. 1 is a block diagram schematically showing a functional construction of a robot according to this embodiment.

FIG. 1 schematically shows a functional structure of the robot 1 according to this embodiment. As shown in FIG. 1, the robot 1 is composed of a control unit 2 for controlling the entire operation and other data processes, an input/output group 3, a driving group 4 and a power source 5.

The input/output group 3 includes, as its input group, a charge coupled device (CCD) camera 10 corresponding to the eyes of the robot 1, a microphone 11 corresponding to the ears, touch sensors 13 arranged on parts such as the head and back for sensing user's contacts, and other various sensors for five senses. In addition, as its output group, there exist a loudspeaker 12 corresponding to the mouse, an LED indicator (eye lights) 14 for expressing feelings by a combination and timing of blinking. The output group is able to express user feedback from the robot 1 by means of, for example, voice and blinking of lights, other than machine motions with legs.

The driving group 4 is a functional block for realizing body motions of the robot 1 according to prescribed motion patterns instructed by the control unit 2 and is to be controlled through action control. The driving group 4 is a functional module for realizing the degree of freedom in each joint of the robot 1, and is composed of a plurality of driving units $15_1$ to $15_n$ arranged in the roll axes, pitch axes, and yaw axes in the joints. Each driving unit $15_1$ to $15_n$ is composed of a motor $16_1$ to $16_n$ which rotates around a prescribed axis, an encoder $17_1$ to $17_n$ for detecting a rotational position of the motor $16_1$ to $16_n$ and a driver $18_1$ to $18_n$ for adaptively controlling the rotational position and rotational speed of the motor $16_1$ to $16_n$ based on an output of the encoder $17_1$ to $17_n$.

Depending on a combination of the driving units, the robot 1 can be constructed as a leg type moving robot such as two-leg walking type or a four-leg walking type, for example.

The power source 5 is a functional module for feeding power to each electrical circuit in the robot 1. The robot 1 according to this embodiment is an autonomous driving robot with a battery. The power source 5 is composed of a charging battery 19, and a charging/discharging control unit 20 for controlling charging and discharging of the charging battery 19.

The charging battery 19 is contained, for example, in a cartridge called a "battery pack" which contains a plurality of lithium-ion secondary battery cells.

Further, the charging/discharging control unit 20 determines the remaining level of the battery 19 by measuring a terminal voltage and the charging/discharging amount of the battery 19 and the temperature around the battery 19, in order to determine the start time and end time of charging. The charging/discharging control unit 20 notifies the control unit 2 of the determined charging start/end time, which is a trigger of starting and ending the charging operation of the robot 1.

The control unit 2 corresponds to a "brain" and is arranged in the head or body of the robot 1, for example.

Figure 2:
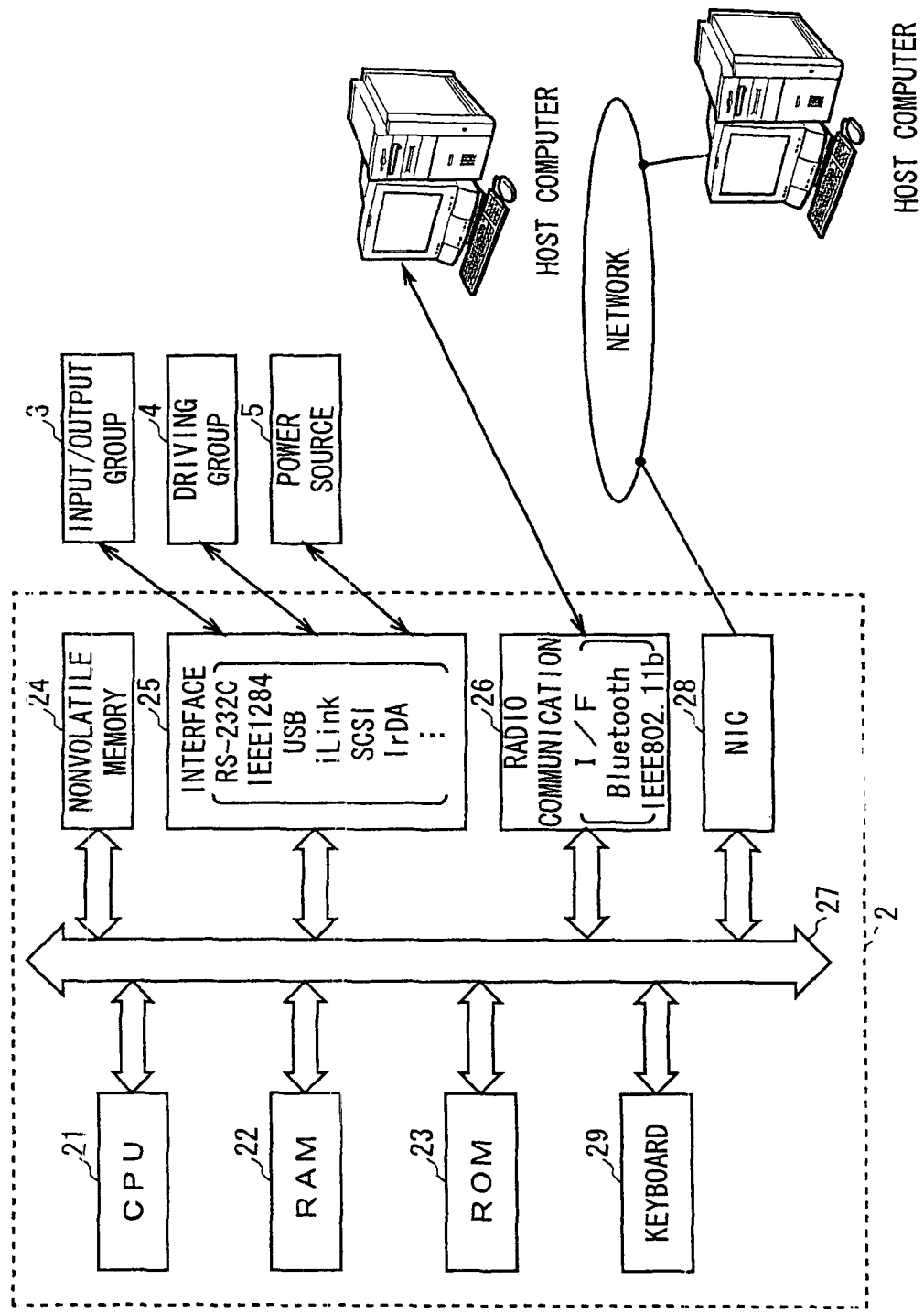
FIG. 2 is a block diagram showing a construction of a control unit.

The control unit 2 is arranged so that a central processing unit (CPU) 21 as a main controller is connected to a memory, other circuit components, and relevant devices with a bus as shown in FIG. 2. The bus 27 is a common signal transmission path including a data bus, an address bus, and a control bus. Each device on the bus 27 is assigned a unique address (memory address or I/O address). The CPU 21 is capable of communicating with a specified device on the bus 27 by designating its address.

A read access memory (RAM) 22 is a writable memory comprising a nonvolatile memory such as dynamic RAM (DRAM) and is used to load program codes which are executed by the CPU 21 and to temporarily store operation data of a program being executed.

A read only memory (ROM) 23 is a read-only memory for permanently storing programs and data. The program codes which are stored in the ROM 23 include a self diagnosis test program which is executed at the time of power-on of the robot 1 and a control program prescribing operation of the robot 1.

The control program of the robot 1 includes a "sensor input/recognition processing program" for processing inputs from sensors such as the CCD camera 10 and the microphone 11 and recognizing them as symbols, an "action control program" for controlling the actions of the robot 1 based on the sensor inputs and prescribed action control models while controlling memory operation such as short-term memory and long-term memory, and a "driving control program" for controlling driving of the joint motors and voice output from the loudspeaker 12 according to the action control models.

The nonvolatile memory 24 comprises memory elements which are electrically erasable and writable, like an electrically erasable and programmable ROM (EEPROM), and is used to store data to be occasionally updated, in a nonvolatile manner. The data to be occasionally updated includes code keys, other security information, and control programs for devices which should be installed after shipping.

An interface 25 is connected to devices other than the control unit 2 so as to communicate data. The interface 25 communicates data with the camera 10, the microphone 11 and the loudspeaker 12 of the input/output group 3. Further, the interface 25 inputs/outputs data and commands to/from the drivers $18_1$ to $18_n$ of the driving group 4.

Furthermore, the interface 25 can be provided with general-purpose interfaces for computer connection to surrounding devices, such as a serial interface such as recommended standard (RS)-232C, a parallel interface such as Institute of Electrical and Electronics Engineers (IEEE) 1284, a Universal Serial Bus (USB) interface, an i-Link (IEEE1394) interface, a Small Computer System Interface (SCSI) interface, and a memory card interface (card slot) for containing a PC card or a memory stick, in order to communicate programs and data with locally connected external devices.

In addition, as another interface 25, an infrared communication (IrDA) interface can be arranged so as to communicate data with external devices by radio.

Further, the control unit 2 includes a radio communication interface 26 and a network interface card (NIC) 28, so as to perform short-distance radio data communication such as Bluetooth, and data communication with various external host computers via a wireless network such as IEEE802.11b or a wide area network such as the Internet.

With such data communication between the robot 1 and a host computer, complicated operation control of the robot 1 can be computed and remote control can be performed with remote computer resources.

(1-2) Software Structure of the Robot 1

Figure 3:
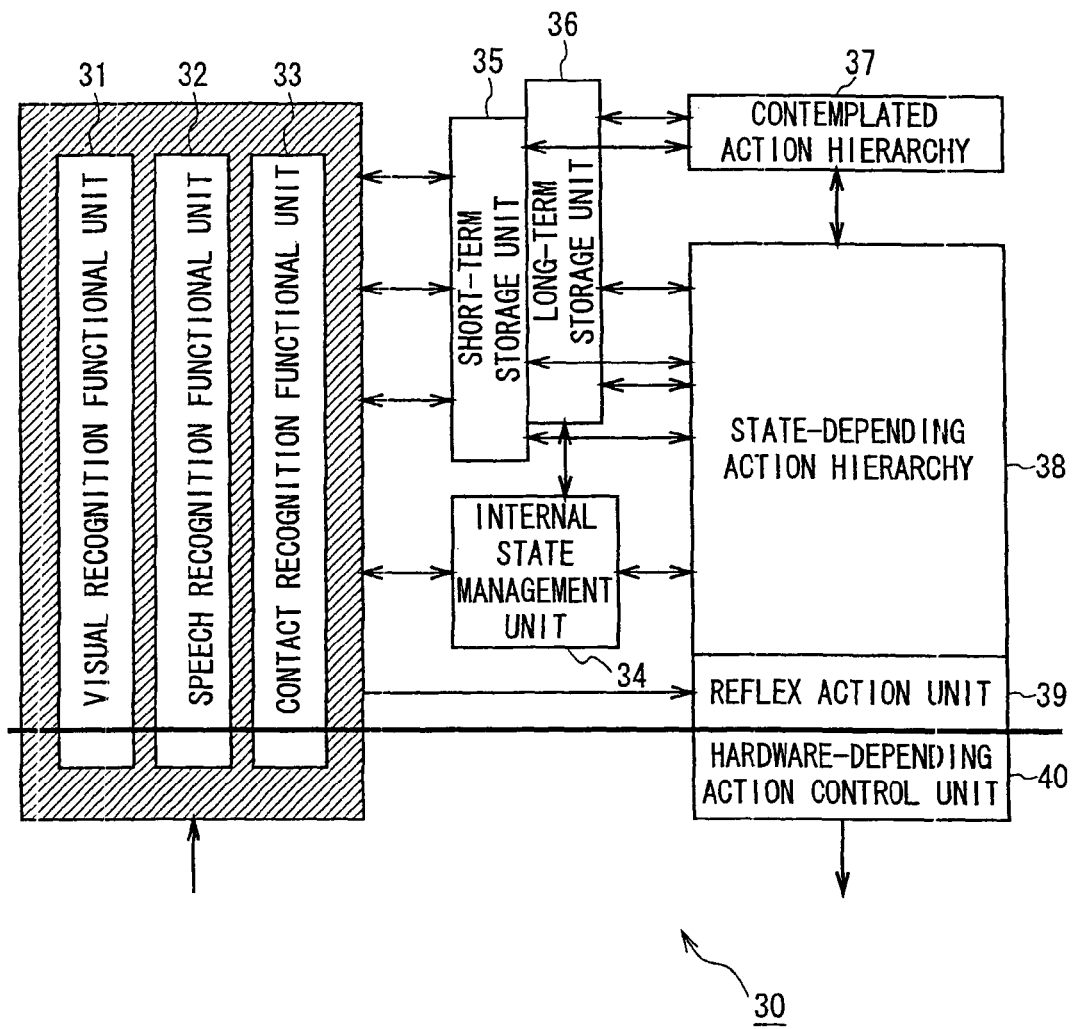
FIG. 3 is a block diagram showing a software structure of the robot.

FIG. 3 schematically shows the functional structure of the action control system 30 of the robot 1 composed of a control program group being stored in the ROM 23. The robot 1 controls actions according to the recognition result of the external stimulation and change of the internal state. Further, the robot 1 is provided with a long-term storage function to associate and store an internal state with an external state, resulting in controlling actions according to the recognition result of the external stimulation and the change of the internal state.

This action control system 30 is installed with an object-oriented programming. In this case, each software is treated on a basis of module called "object" in which data and a process of the data are associated with each other. In addition, each object can be used for data communication and Invoke with an inter-object communication method using message communication and a shared memory.

The action control system 30 is provided with a visual recognition functional unit 31, a speech recognition functional unit 32, and a contact recognition functional unit 33 for recognizing external environments based on sensor outputs of the CCD camera 10, the microphone 11, and the touch sensor 13 of the input/output group 3.

The visual recognition functional unit 31 performs an image recognition process such as face recognition and color recognition and feature extraction based on a video signal comprising sensor outputs of the CCD camera 10. The visual recognition functional unit 31 outputs information including a face identification (ID) unique to a person, and the position and size of a face region which are face recognition results, and information including the position, size and feature amount of a color region which are color recognition results.

The speech recognition functional unit 32 executes various recognition processes regarding sounds, such as speech recognition and speaker recognition, based on an audio signal comprising sensor outputs of the microphone 11. The speech recognition functional unit 32 outputs character string information of recognized words which is a speech recognition result and speaker ID information unique to the speaker which is a speaker recognition result based on the acoustic features.

The contact recognition functional unit 33 recognizes external stimulation such as "stroked" or "pat" based on a pressure detection signal comprising sensor outputs of the touch sensors 13, and outputs the recognition result.

An internal state management unit 34 manages plural kinds of emotions including instincts and feelings in a form of numerical models, and manages the internal state such as instinct and emotion of the robot 1 based on external stimulation recognized by the visual recognition functional unit 31, the speech recognition functional unit 32 and the contact recognition functional unit 33.

On the other hand, the action control system 30 is provided with a short-term storage unit 35 for short-term memory which disappears with time and a long-term storage unit 36 for relatively long-term memory of information, in order to control actions according to recognition results of external stimulation and change of the internal state. The classification of memory mechanism, i.e., the short-term memory and the long-term memory are determined based on nerve psychology.

The short-term storage unit 35 is a functional module for storing in a short time targets and events recognized toy the visual recognition functional unit 31, the speech recognition functional unit 32, and the contact recognition functional unit 33. For example, input images from the CCD camera 10 are stored for a short time of about 15 seconds.

The long-term storage unit 36 is used for storing in a long time information such as object names obtained by learning, and the RAM 22 and the nonvolatile memory 24 of the control unit 2 (FIG. 2) are used for this purpose.

Further, actions of the robot 1 which are created by the action control system 30 are classified into "reflex action" realized by a reflex action unit 39, "state-depending action" realized by a state-depending action hierarchy 38, and "contemplated action" realized by a contemplated action hierarchy 37.

The reflex action unit 39 is a functional module for realizing reflex body motion in response to external stimulation recognized by the visual recognition functional unit 31, the speech recognition functional unit 32 and the contact recognition functional unit 33.

Basically, a reflex action is an action which directly determines an output action by directly receiving recognition results of external information entered from the sensors. For example, it is desirable that tracking a human's face and nodding are provided as reflex actions.

The state-depending action hierarchy 38 controls actions suitable for the current state of the robot 1 based on the stored contents of the short-term storage unit 35 and the long-term storage unit 36, and the internal state managed by the internal state management unit 34.

The state-depending action hierarchy 38 prepares a state machine for every action, and classifies recognition results of the external information entered from the sensors, depending on previous actions and states, and expresses an action with body. In addition, the state-depending action hierarchy 38 realizes an action (homeostasis action) to keep the internal state within a certain range. In a case where the internal state is over a designated range, the hierarchy 38 activates an action for returning the internal state within the range so that the action is easy to express (actually, an action is selected considering both the internal state and external environments). State-depending actions need a long response time as compared with reflex actions.

The contemplated action hierarchy 37 makes a relatively long-term action plan of the robot 1 based on the stored contents of the short-term storage unit 35 and the long-term storage unit 36.

A contemplated action is an action which is made by assumption and making a plan to realize the assumption based on a given state or a command from a human. For example, path searching from a robot's position to a target position is a contemplated action. Such assumption and plan may require a processing time and arithmetic load (that is, it takes a processing time), as compared with a response time of the robot 1 to keep interaction. Therefore, while taking reflex actions and state-depending actions in real time, such assumption and plan are made for a contemplated action.

The contemplated action hierarchy 37, the state-depending action hierarchy 38, and the reflex action unit 39 are described as an upper-layer application program independent on the hardware structure of the robot 1. On the other hand, a hardware-depending hierarchy control unit 40 outputs sound from the loudspeaker 12 of the input/output group 3, makes the LED 14 blink in a prescribed pattern, and drives relevant driving units $15_1$ to $15_n$ in the driving group 4, according to commands from the upper-layer applications.

(1-3) Construction of the Internal State Management Unit 34

Out of the structural elements of the action control system 30, the construction of the internal state management unit 34 which directly relates to the conversation control function described later will be now described.

The internal state management unit 34 manages the instincts and feelings formed in the numerical models as described above, and changes the instincts and feelings according to the external stimulation recognized by the visual recognition functional unit 31, the speech recognition functional unit 32 and the contact recognition functional unit 33.

this case, as instinctive elements composing the instincts, there are nine instinctive elements: fatigue, body temperature, pain, hunger, thirst, affection, curiosity, elimination, and sexual. As emotional elements composing the feelings, there are 18 emotional elements: happiness, sadness, anger, surprise, disgust, fear, frustration, boredom, somnolence, gregariousness, patience, tense, relaxed, alertness, guilt, spite, loyalty, submission, and jealousy.

The internal state management unit 34 keeps these instinctive elements and emotional elements as parameters indicating the strength of the elements, and periodically updates the parameter values of the elements based on the recognition results of the visual recognition functional unit 31, the speech recognition functional unit 32 and the contact recognition functional unit 33 and elapsed time, resulting in changing the instinct and feelings of the robot 1.

Specifically, regarding each instinctive element, using the variation amount ΔI[k] of the instinctive element calculated with a prescribed arithmetic operation based on the recognition results of the visual recognition functional unit 31, the speech recognition functional unit 32 and the contact recognition functional unit 33 and the elapsed time, the current parameter value I[k] of the instinctive element, and a coefficient $k_i$ representing the sensitivity of the instinctive element, the internal state management unit 34 calculates a parameter value I[k+1] of the instinctive element in the next cycle with the following expression (1) at prescribed intervals.

$$I[k+1]=I[k]+k_i \times \Delta I[k] \quad (1)$$

This calculation result is replaced with the current parameter value I[k] of the instinctive element to update the parameter value of the instinctive element.

In addition, regarding each emotional element, using the variation amount ΔE[t] of the emotional element calculated with a prescribed arithmetic operation based on the recognition results of the visual recognition functional unit 31, the speech recognition functional unit 32 and the contact recognition functional unit 33, the robot's action of this time and the elapsed time from last updating, the current parameter value E[t] of the emotional element, and a coefficient $k_e$ representing the sensitivity of the emotional element, the internal state management unit 34 calculates the parameter value E[t+1] of the emotional element in the next cycle with the following expression (2).

$$E[t+1]=E[t]+k_e \times \Delta E[t] \quad (2)$$

The calculated value is replaced with the current parameter value of the emotional element, resulting in updating the parameter value of the emotional element.

Note that an effect type of the recognition results of the visional recognition functional unit 31, the speech recognition functional unit 32 and the contact recognition functional unit 33 to each of the instinctive elements and emotional elements is predetermined. For example, the recognition result of "stroked" obtained by the contact recognition functional unit 33 have a large effect on the variation amount ΔI[k] of the parameter value of an instinctive element "affection" and the variation amount ΔE[t] of the parameter value of an emotional element "happiness".

(2) Conversation Control Function by Tracking in Robot 1

This robot 1 is provided with a conversation control function to make conversation with a user and a tracking function to track the existence of the user who is a conversation partner, so as to surely recognize the existence of the conversation partner without being affected by current environments.

(2-1) Conversation Control Function of the Robot 1

First the conversation control function installed in the robot 1 will be described.

The robot 1 is provided with a conversation control function to obtain information (hereinafter, referred to as item values) on some prescribed items such as name, birthday, and favorites of a user and other object (hereinafter, collectively referred to as user) through conversation with the user, store them in a prescribed format as shown in FIG. 4, for example, and use the item values being stored to make conversation with the user.

Referring to FIG. 4, item values ("Yukiko", "human", "0", "1", "73/5/2", "tea", "Kazumi") corresponding to various prescribed items ("name", "kind", "face ID", "speaker ID", "birthday", "favorite", and "friend") are stored. The first numerical value in each row indicates an ID (object ID) of an object assigned at the time of first registration of the object.

FIG. 4 shows a state after all item values of objects have been already obtained. Out of the items, "name", "speaker ID", "birthday", "favorite" and "friend" are obtained with the various speech recognition processes of the speech recognition functional unit 32 through conversation with users and stored. "Face ID" and "kind" are obtained with various image recognition processes of the visual recognition functional unit 31 during conversation with users and stored.

In addition, numerical values written on the right side of the item values in FIG. 4 are impression levels of the item values. These impression values are indexes which are used to determine whether the robot 1 can use a item value as a topic for later conversation. For example, in this example of FIG. 4, the higher this impression level, the better the impression (this item value should be used as a topic for next conversation). The lower this impression level, the worse the impression (this item value should not be used), on the contrary.

In this embodiment, an impression level is given to an item value based on a difference between the parameter value of "affection" of the internal state management unit 34 just before the item value is obtained and the parameter value of "affection" just after the item value is obtained.

The conversation control function is mainly performed by the processes of the state-depending action hierarchy 38 in the action control system 30 described above with reference to FIG. 3. And this conversation control function is performed by a conversation control unit 38A of the state-depending action hierarchy 38 as shown in FIG. 5.

Figure 5:
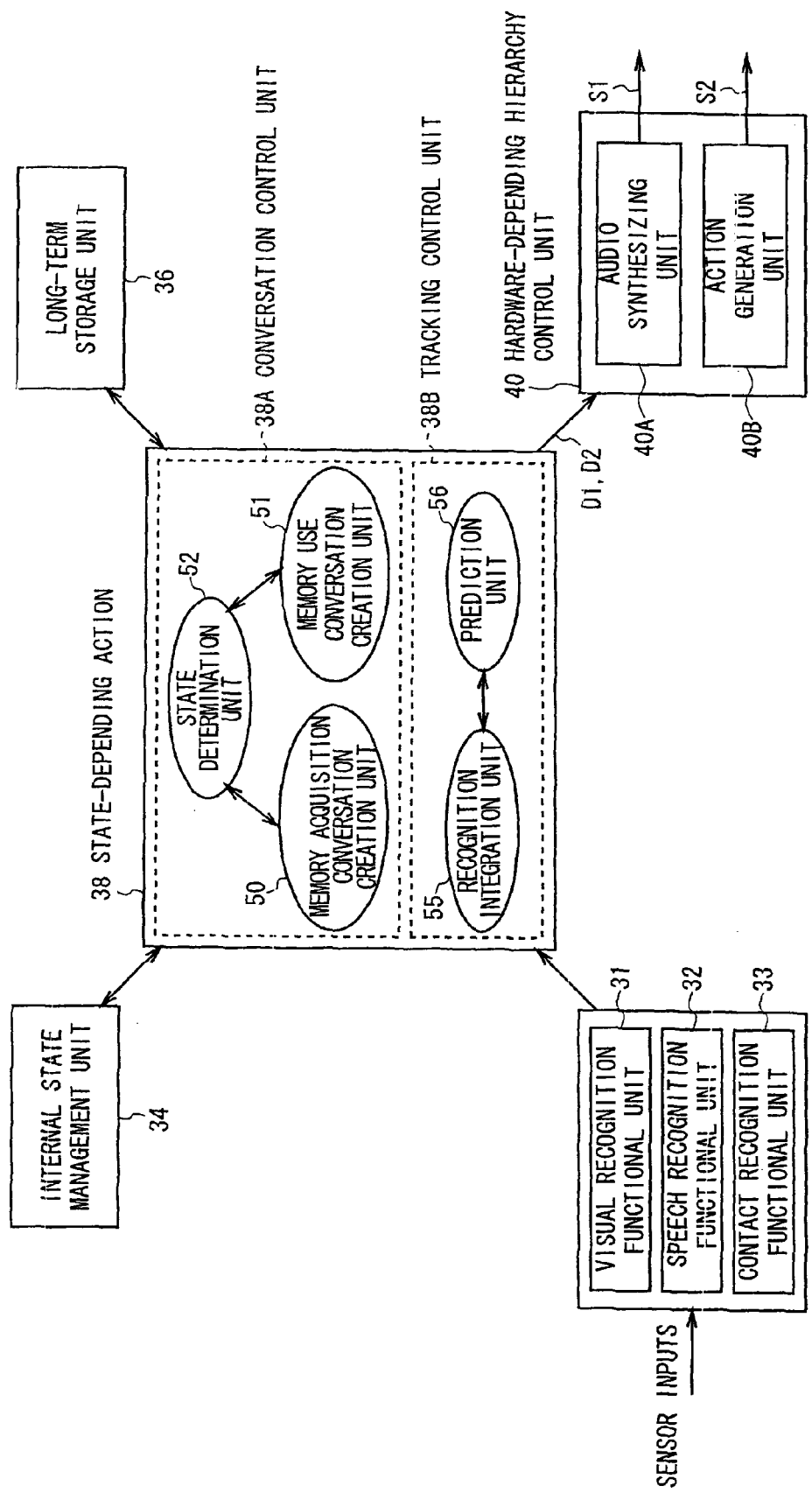
FIG. 5 is a conceptual view showing main parts regarding a conversation control function and a tracking function.
Figure 6:
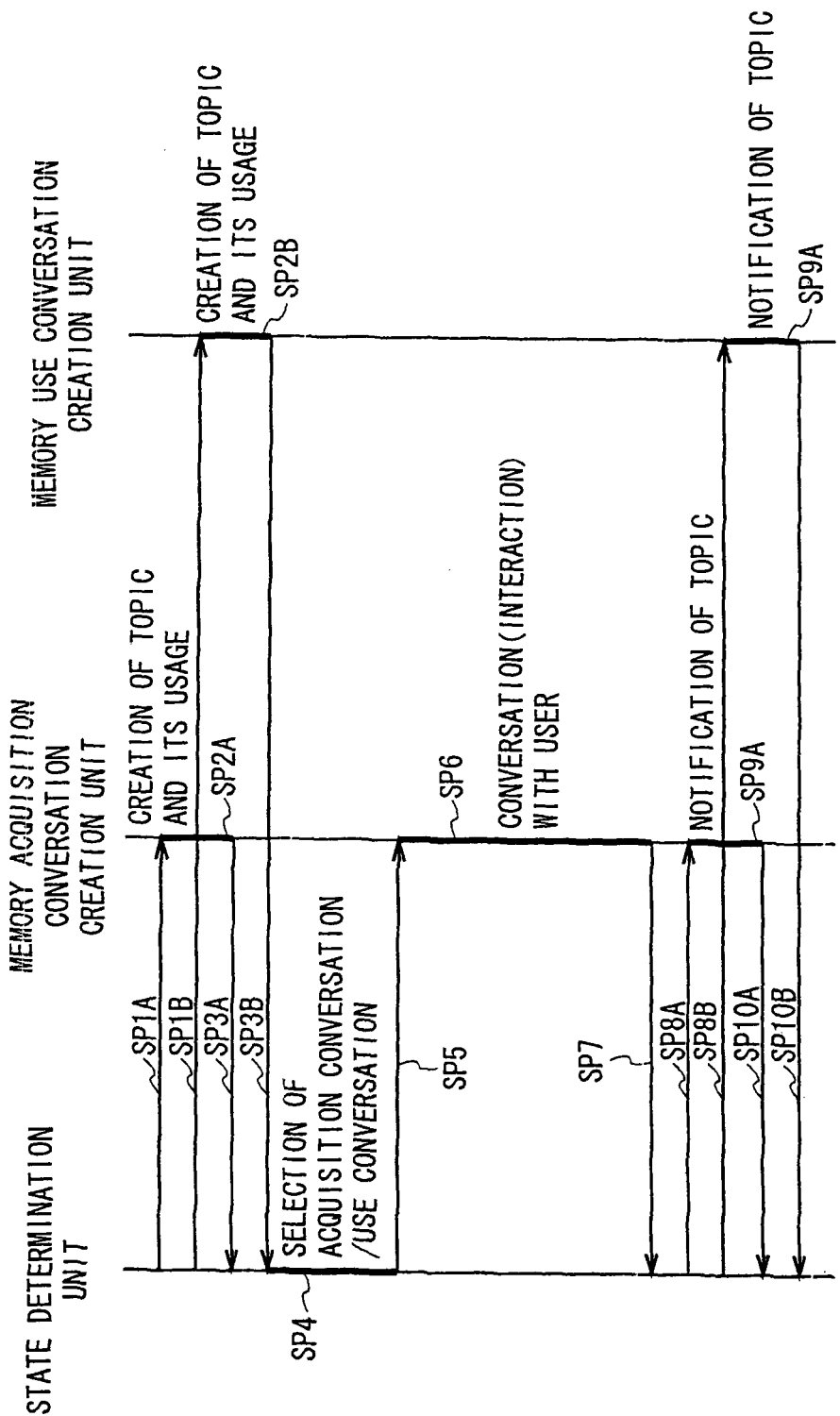
FIG. 6 is a conceptual view explaining a conversation creation procedure.

The processing contents of the conversation control unit 38A are functionally classified into a memory acquisition conversation creation unit 50 for creating conversation (hereinafter, referred to as acquisition conversation) for acquiring a value of each item on a user, a memory use conversation creation unit 51 for creating conversation (hereinafter, referred to as use conversation) by using the acquired values of each item on a user, and a state determination unit 52 for controlling these memory acquisition conversation creation unit 50 and memory use conversation creation unit 51, as shown in FIG. 5.

In this case, when the state determination unit 52 recognizes the existence of a user which may be a conversation partner, based on the recognition result of the visual recognition functional unit 31 and the recognition result of the speech recognition functional unit 32 obtained via the short-term storage unit 35 (FIG. 3), this unit 52 sends the user's face ID and speaker ID, which are obtained as the recognition results of the visual recognition functional unit 31 and the speech recognition functional unit 32, to the memory acquisition conversation creation unit 50 and the memory use conversation creation unit 51, and asks the memory acquisition conversation creation unit 50 and the memory use conversation creation unit 51 whether they are able to create acquisition conversation or use conversation (step SP1A, step SP1B).

At this time, the memory acquisition conversation creation unit 50 and the memory use conversation creation unit 51 perform a conversation creation process for creation of a topic and a usage of the topic indicating how to use the created topic to create acquisition conversation or use conversation, with a prescribed topic creation rule and topic usage determination rule (step SP2A, step SP2B).

In this case of the embodiment, there are seven rules as the topic creation rules.

The first topic creation rule is a rule to select a different item regarding the same object as a topic used in the previous conversation, as a next topic. In this embodiment, an item of a higher impression level is sequentially selected. For example, in a case where a topic in the previous conversation is "birthday" of the "object ID 1" in FIG. 4, an item of the highest impression level out of the other items of the same "object ID 1" is selected as a topic for the next conversation.

The second topic creation rule is a rule to select a related item of the same object as a topic used in the previous conversation, as a next topic. For example, in a case where a topic in the previous conversation is "favorite" of the "object ID 1" in FIG. 4, the "dislike" of the "object ID 1" is selected as a topic for the next conversation.

The third topic creation rule is a rule to select an item of an object which can be specified based on the item value of a topic used in the previous conversation, as a next topic. In this embodiment, an object with a higher impression level is sequentially selected as a next object. For example, in a case where a topic in the previous conversation is "friend" of "object ID 1" in FIG. 4, any item of the "object ID 2", which is the "friend", is selected as a topic for the next conversation.

The fourth topic creation rule is a rule to select the same item of the same object as a topic used in the previous conversation, as a next topic. For example, in a case where "birthday" of the "object ID 1" is a topic in the previous conversation in FIG. 4, the same "birthday" of the same "object ID 1" is selected as a topic for the next conversation.

The fifth topic creation rule is a rule to select the same item of a different object having the same item value as a topic used in the previous conversation. For example, in a case where "favorite" of the "object ID 1" is a topic in the previous conversation in FIG. 4, the "favorite" of the "object ID 3" having the same "favorite" value "tea" is selected as a topic for the next conversation.

The sixth topic creation rule is a rule to select an item of a different object having an item value relating to the item value of a topic used in the previous conversation, as a next topic. For example, in a case where a topic in the previous conversation is "favorite" of the "object ID 2" in FIG. 4, the "object ID 6" of which "favorite" is "horse race" is selected based on the "favorite" of "horse", and this "favorite" of this "object ID 6" is selected as a topic for the next conversation.

The seventh topic creation rule is a rule to select the same item of a different object from an object of a topic used in the previous conversation. For example, in a case where the topic of the previous conversation is "favorite" of the "object ID 1" in FIG. 4, the "favorite" of the "object ID 2" is selected as a topic for the next conversation.

It should be noted that the first to third topic creation rules out of the first to seventh topic creation rules can be used for both creation of acquisition conversation and creation of use conversation. The fourth to seventh topic creation rules, however, cannot be used for creation of acquisition conversation but are effective for creation of acquisition conversation.

Therefore, the memory acquisition conversation creation unit 50 randomly selects one out of these first to three topic creation rules and the memory use conversation creation unit 51 randomly selects one out of these first to seventh topic creation rules. With a selected topic creation rule, in a case where a topic of the previous conversation is "favorite of object ID 1", for example, "friend of object ID 1", "dislike of object ID 1", "birthday of object ID 2", "birthday of object ID 1", "favorite of object ID 3", or "favorite of object ID 6" is selected as a topic for the next conversation.

On the other hand, in this embodiment, there are three rules as topic usage determination rules.

The first topic usage determination rule is a rue to create conversation by using a corresponding item value being stored in the long-term storage unit 36 as it is. For example, in a case where "favorite of object. ID 1" is determined as a topic, such conversation as "Yukiko's favorite is tea, isn't it." or "What is your favorite?" is created.

The second topic usage determination rule is a rule to search a database based on a corresponding item value being stored in the long-term storage unit 36, for a related matter, and create conversation by using the matter. For example, in a case where "birthday of object ID 1" is determined as a topic, an anniversary database is searched with "73/5/2", which is the item value of "birthday", as a keyword, and by using an obtained matter "traffic notification", such conversation as "Do you know May 2 is a day of traffic notification." is created.

The third topic usage determination rule is a rule to search a database based on a related item value obtained by calculation or assumption from a corresponding item value being stored in the long-term storage unit 36, for a related matter, and create conversation by using this matter. For example, in a case where "birthday of object ID 1" is determined as a topic, an astrology database is searched with "Taurus" obtained from "73/5/2", which is an value of "birthday", as a keyword, and by using the obtained matter "patient", such conversation as "Do you know people of Taurus are quite patient." is created.

Out of the first to third topic usage determination rules, the first topic usage determination rule can be used for both creation of acquisition conversation and creation of use conversation. The second and third topic usage determination rules cannot be used for creation of acquisition conversation but are effective for creation of use conversation.

Therefore, the memory acquisition conversation creation unit 50 selects the first topic usage determination rule and the memory use conversation creation unit 51 randomly selects one of the first to third topic usage determination rules. With a selected topic usage determination rule, conversation for acquiring information or conversation by using acquired information is created.

When the memory acquisition conversation creation unit 50 and the memory usage conversation creation unit 51 create a topic and determine its usage with the topic creation process, they notify the state determination unit 52 of this matter, the topic and its usage. Even if a topic cannot be created, the state determination unit 52 is notified of this matter (step SP3A, step SP3B).

When the state determination unit 52 is notified from both the memory acquisition conversation creation unit 50 and the memory use conversation creation unit 51 that a topic has been created and its usage has been determined, it selects one of the memory acquisition conversation creation unit 50 and the memory use conversation creation unit 51 based on a first ratio and a second ratio, the first ratio meaning the ratio of the number of items of which values has not been acquired to the number of all items of the conversation partner, the second ratio meaning the ratio of the number of items of which values has already acquired to the number of all items of the conversation partner (step SP4).

More specifically, the state determination unit 52 selects the memory acquisition conversation creation unit 50 when the first ratio is the second ratio or greater, and selects the memory use conversation creation unit 51 when the first ratio is smaller than the second ratio.

When the state determination unit 52 selects any one in such a manner, it gives the selected memory acquisition conversation creation unit 50 or memory use conversation creation unit 51 a command to start a process (hereinafter, referred to as conversation creation process) to create acquisition conversation or use conversation based on the topic and its usage.

On the other hand, when the state determination unit 52 is notified of a topic and its usage from one of the memory acquisition conversation unit 50 and memory use conversation creation unit 51, it gives the memory acquisition conversation creation unit 50 or memory use conversation creation unit 51 a command to start the conversation creation process based on the topic and its usage (step SP5).

Therefore, in response to the command, the memory acquisition conversation creation unit 50 or the memory use conversation creation unit 51 starts the conversation creation process, accesses the internal state management unit 34 to obtain a parameter value of "affection" out of the instinctive elements, and sequentially sends an audio synthesizing unit 40A of the hardware-depending action control unit 40 character string data D1 comprising the contents of a series of conversation for realizing acquisition conversation or use conversation including conversation for acquiring information (hereinafter, referred to as acquisition conversation) or conversation by using acquired information (hereinafter, referred to as use conversation) created based on the topic and its usage determined as described above.

As a result, an audio signal S1 is created in the audio synthesizing unit 40A based on the character string data D1 and given to the loudspeaker 12 (FIG. 1), resulting in outputting sound of the conversation contents forming acquisition conversation comprising a series of conversation including acquisition conversation "what is Yukiko's favorite?" or sound of conversation contents forming use conversation comprising a series of conversation including use conversation "Yukiko's favorite is tea, isn't it." (step SP6).

Then at this time, user's response to this topic is collected by the microphone 11 and given to the speech recognition functional unit 32 of the action control system 30 (FIG. 3), to be recognized by this unit 32.

Thus in a case where the memory acquisition conversation creation unit 50 is selected in step SP4, this memory acquisition conversation creation unit 50 extracts an answer to the question (that is, an item value which is desired to be acquired) based on the acquisition conversation, from the user response to the acquisition conversation, based on the speech recognition result of the speech recognition functional unit 32, and stores it in the long-term storage unit 36 in the format described above with reference to FIG. 4 (step SP6).

Further, simultaneously, the memory acquisition conversation creation unit 50 accesses the internal state management unit 34 to obtain a current parameter value of "affection", calculates a difference between the obtained parameter value and the parameter value of the same "affection" obtained just before the conversation, and stores the calculation result in the long-term memory 34 as an impression level of the item value obtained as described above for the user, by associating it with the item value.

When the memory acquisition conversation creation unit 50 or the memory use conversation creation unit 51 finishes the acquisition conversation or the use conversation, it notifies the state determination unit 52 of this matter (step SP7). In response to this notification, the state determination unit 52 notifies the memory acquisition conversation creation unit 50 and the memory use conversation creation unit 51 of the topic and its usage given in step SP3A or step SP3B from the memory acquisition conversation creation unit 50 or the memory use conversation creation unit 51 selected in step SP4 (step SP8A, step SP8B).

Thus the memory acquisition conversation creation unit 50 and the memory use conversation creation unit 51 store the given topic and its usage as a conversation history (step SP9A, step SP9B), and create acquisition conversation or use conversation in the above-described manner so as not to make the same conversation in one-to-one conversation with the same conversation partner until conversation ends (step SP10A-step SP1A to step SP10A, step SP10B-step SP1B to step SP10B).

As described above, the robot 1 is able to have unique conversation with a user while naturally and sequentially changing topics by naturally obtaining and using various information on the user.

(2-2) Tracking Function of Robot 1

Next the tracking function provided to the robot 1 will be described.

The robot 1 has a tracking function capable of surely tracking the existence of a conversation partner. The tracking function is mainly realized by the process of the state-depending action hierarchy 38 of the action control system 30 described above with reference to FIG. 3. Then this tracking function is realized by a tracking control unit 38B of the state-depending action hierarchy 38 as described above with reference to FIG. 5.

The processing contents of the tacking control unit 38B are functionally classified into a recognition integration unit 55 for integrating the recognition results of the visual recognition functional unit 31, the speech recognition functional unit 32 and the contact recognition functional unit 33, and a prediction unit 56 for predicting the position of a conversation partner based on the integration result of the recognition integration unit 55.

In this case, the recognition integration unit 55 recognizes the existence of the conversation partner in view of the face image, speech voice and contact state of the conversation partner, based on the recognition results of the visual recognition functional unit 31, the speech recognition functional unit 32 and the contact recognition functional unit 33.

That is, out of the image recognition processes which are performed based on a video signal comprising the sensor outputs of the CCD camera 10, the visual recognition functional unit 31 executes the three kinds of recognition processes of skin color recognition, face recognition and personal recognition, in order of the skin color recognition process, the face recognition process and the personal recognition process stepwise, and then sends the results of the recognition processes to the recognition integration unit 55.

These recognition processes such as skin color recognition, face recognition and personal recognition have different recognition levels to recognize a person's face. The personal recognition process to specify who is a target person has the highest recognition level. The face recognition process to recognize whether an image is a face of a person or the like has the middle recognition level. The skin color recognition process which is the easiest recognition has the lowest recognition level.

Specifically, the visual recognition functional unit 31 detects a skin color region from an image based on a video signal, and determines based on the detection result whether an target object in the image is a human's face. When the visual recognition functional unit 31 determines the human's face, it specifies based on the image of the face region who is the conversation partner and then sends the recognition result to the recognition integration unit 55.

The speech recognition functional unit 32 performs a sound direction recognition process to recognize which direction sound has come from, out of various recognition processes regarding sound which are performed based on an audio signal comprising sensor outputs of the microphone 11, and sends this recognition result to the recognition integration unit 55.

For example, in a case where a plurality of microphones 11 is provided in the input/output group 3 (FIG. 1), the plurality of microphones 11 are used to assume a direction of a sound resource of the entered sound event. Specifically, as disclosed in ""acoustic system and digital processing" Oga, Yamazaki, Kaneda (Electrical information communication society) p 197" for example, the direction of a sound resource can be predicted by using one-to-one relationship between the sound resource and a time difference among the signals received by the plurality of microphones.

Figure 7:
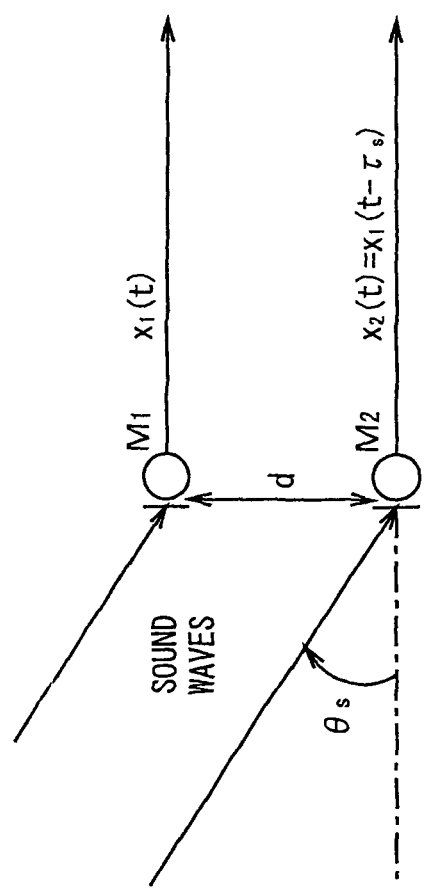
FIG. 7 is a conceptual view explaining a sound direction recognition process.

That is, as shown in FIG. 7, in a case where a plane wave coming from θS direction is received by two microphones M1 and M2 arranged at a distance of d, there are the following relations (3) and (4) between the received signals x1(t) and x2(t) of the microphone M1 and M2.

$$x2(t)=x1(t-Ts) \quad (3)$$

$$Ts=(d \sin \theta s)/c \quad (4)$$

c in the expressions (1), (2) is the velocity of sounds, and τS is a time difference of signals received by the two microphones M1 and M2.

Therefore, if the time difference τ S between the received signals x1(t) and x2(t) can be obtained, the following expression (5):

$$\theta s = \sin^{-1}(cTs/d) \quad (5)$$

can be used to obtain the direction from which the sound has come, that is a sound resource direction.

Now, with the following expression (6):

$$\phi 12(T)=E[x1(t) \cdot x2(t+T)] \quad (6)$$

the time difference τS can be obtained from the cross-correlation function $\phi 12(\tau)$ between the received signals x1(t) and x2(t). E[•] in the expression (4) is an expected value.

From the above expression (1) and expression (4), the cross-correlation function $\phi 12(\tau)$ is expressed as follows (7):

$$\phi 12(T)=E[x1(t) \cdot x1(t+T-Ts)]=\phi 11(T-Ts) \quad (7)$$

Here, $\phi 11(\tau)$ in the expression (5) is a self-correlation function of the received signal x1(t).

Since it is known that the self-correlation function $\phi 11(\tau)$ has the maximum value when τ=0, the cross-correlation function $\phi 12(\tau)$ has the maximum value when τ=τS based on the expression (5). Therefore, τS can be obtained when τ producing the maximum value is obtained by calculating the cross-correlation function $\phi 12(\tau)$. Then by substituting this in the above expression (3), the direction from which the sound wave has come, that is, a sound resource direction can be obtained.

The speech recognition functional unit 22 (FIG. 5) can determine whether a sound event collected by the microphone 11 is voice. Specifically, by statistically modeling voice and non-voice with the Hidden Markov Mode 1 (HMM) method and comparing their likelihood, it can be determined whether the audio event is voice. In addition, the speech recognition functional unit is capable of roughly determining whether the sound source is close or not, by calculating a predicted distance to the sound source with a technique disclosed by a reference "F. Asano, H. Asoh and T. Matsui, "Sound Source Localization and Separation in Near Field", IEICE Trans. Fundamental, Vol. E83-A, No. 11, 2000".

Further, the contact recognition functional unit 33 performs the contact recognition process to recognize whether the user has touched, out of the recognition processes regarding external stimulation which are performed based on the pressure detection signal comprising sensor outputs of the touch sensors 13. Then the contact recognition functional unit sends the recognition result to the recognition integration unit 55.

The recognition integration unit 55 integrates the recognition results of the visual recognition functional unit 31, the speech recognition functional unit 32, and the contact recognition functional unit 33. The integration here means integration of information for the same region of an image, for example, it results that a face and a skin color are confirmed although a person cannot be recognized. That is, in a case of receiving information on whether each recognition of the visual recognition functional unit 31, the speech recognition functional unit 32 and the contact recognition functional unit 33 is successful and the recognition information sent as recognition results since the recognition is successful, the recognition integration unit 55 assumes a direction of the conversation partner from prescribed recognition results or one or more recognition results out of the recognition results.

Thus, based on the recognition results, the recognition integration unit 55 sequentially sends an action generation unit 40B of the hardware-depending action control unit 40 tracking action data D2 representing action contents for tracking the existence of a conversation partner.

As a result, an action determination signal S2 is created in the action generation unit 40B based on the tracking action data D2, and given to relevant driving units $15_1$ to $15_n$ of the driving group 4 (FIG. 1), thereby moving a neck joint of the robot 1 so that the center of gravity of conversation partner's face is positioned at a center of the input image, for example.

When the personal recognition process is failed, the recognition integration unit 55 uses any recognition result of the other face recognition process, skin color recognition process, sound direction recognition process and contact recognition process to continue tracking. For example, the direction (position) of the conversation partner's face is predicted by using the recognition result of the face recognition process. That is, although a personal cannot be specified, the face recognition process was successful, and in a case where a face has been confirmed, it is assumed that the person has been tracked with the face as the same person, and the driving group 4 is controlled so that the face region is placed at the center of the input image. When the face recognition result is failed, the recognition result of the skin color recognition process is used, for example. When the skin color recognition process is also failed, the recognition result of the sound direction recognition process is used and the driving group 4 is controlled so that the robot 1 faces toward the sound direction.

A method of determining which recognition result is used with priority can be preset in the recognition integration unit 55, or the robot 1 can suitably make a selection. For example, the recognition result of a recognition process which is the closest to the position (direction) of the conversation partner just before the personal recognition process is failed may be used.

When the prediction unit 56 receives the recognition integration result from the recognition integration unit 55 and the target cannot be temporarily recognized because of unreliable recognition results of the recognition processes (in a case where the recognition is failed), the prediction unit 56 predicts the position of the target. For example, if the recognition results of all recognition processes are failed, the prediction unit 56 predicts the current position (direction) of the target based on the recognition results obtained until the failure.

When the prediction unit 56 always receives the recognition integration result from the recognition integration unit 55 and the above-described tracking control unit cannot recognize the target, the prediction unit 56 is controlled so as to start prediction of the target position or to wait for a recovery of various kinds of recognition processes for a prescribed period. As an alternative way, when the target cannot be recognized, the recognition integration unit 55 may send the prediction unit 56 the recognition results until the failure to instruct the prediction unit 56 to predict the target position.

Then the prediction unit 56 predicts the target direction from the recognition result just before the target cannot be recognized, and sends the predicted direction to the driving group 4 (FIG. 1). That is, the environmental recognition with images necessary for the robot's tracking is often unstable, and is sensitive to lightening and the face angle of the person. When the lightening and face angle change little, the visual recognition functional unit 31 may fail the various kinds of recognition processes. In addition, when a target such as a ball moves greatly, the bolls moves under a condition of uneven lightening, thus recognition becomes difficult. Further, the autonomous robot 1 always selects an action based on the internal state and external stimulation. For example, in a case where another operation having a higher priority than tracking operation happens, the tracking operation may be stopped and the another operation may start. For example, consider such a situation that, since the robot 1 is called by another person B during having conversation with a person A, the robot 1 makes a short conversation with the person B and then resumes the conversation with the person A. In this situation, after the tracking is stopped, the tracking should be resumed. Although the position of the person A can be stored in principle, the tracking may not be resumed because of unreliable recognition if the person A moves little.

Even in this case, when the target is a moving object, the predicted direction is obtained by predicting the current position (direction) from the previous amount of movement. In addition, in a case where the target object is identified stable during a prescribed period just before the recognition is failed, the direction of the object just before is determined as the predicted position.

Then the action generation unit 40B of the hardware-depending action control unit 40 creates tracking action data D2 based on control information from the recognition integration unit 55 or the prediction unit 56 and outputs this via the driving group 4. That is, regarding the driving units $15_1$ to $15_n$ in the joints of the robot 1, the rotational angle and rotation position are calculated to rotate each joint with each roll, pitch, or yaw axis as a center, and relevant motors $16_1$ to $16_n$ are controlled to be driven, thus making the robot 1 track the movement of the target by, for example, rotating the robot 1's neck.

Note that, although the prediction unit 56 predicts a target direction when all recognition processes are failed, part of the above-described processes of the recognition integration unit 55 can be performed by the prediction unit 56. That is, when the personal recognition process with the highest level is failed, a process to continue tracking by using the recognition results of the face recognition process with the lower level and the sound direction recognition process can be performed by the prediction unit 56.

(3) Conversation Partner Confirmation Procedure

Figure 8:
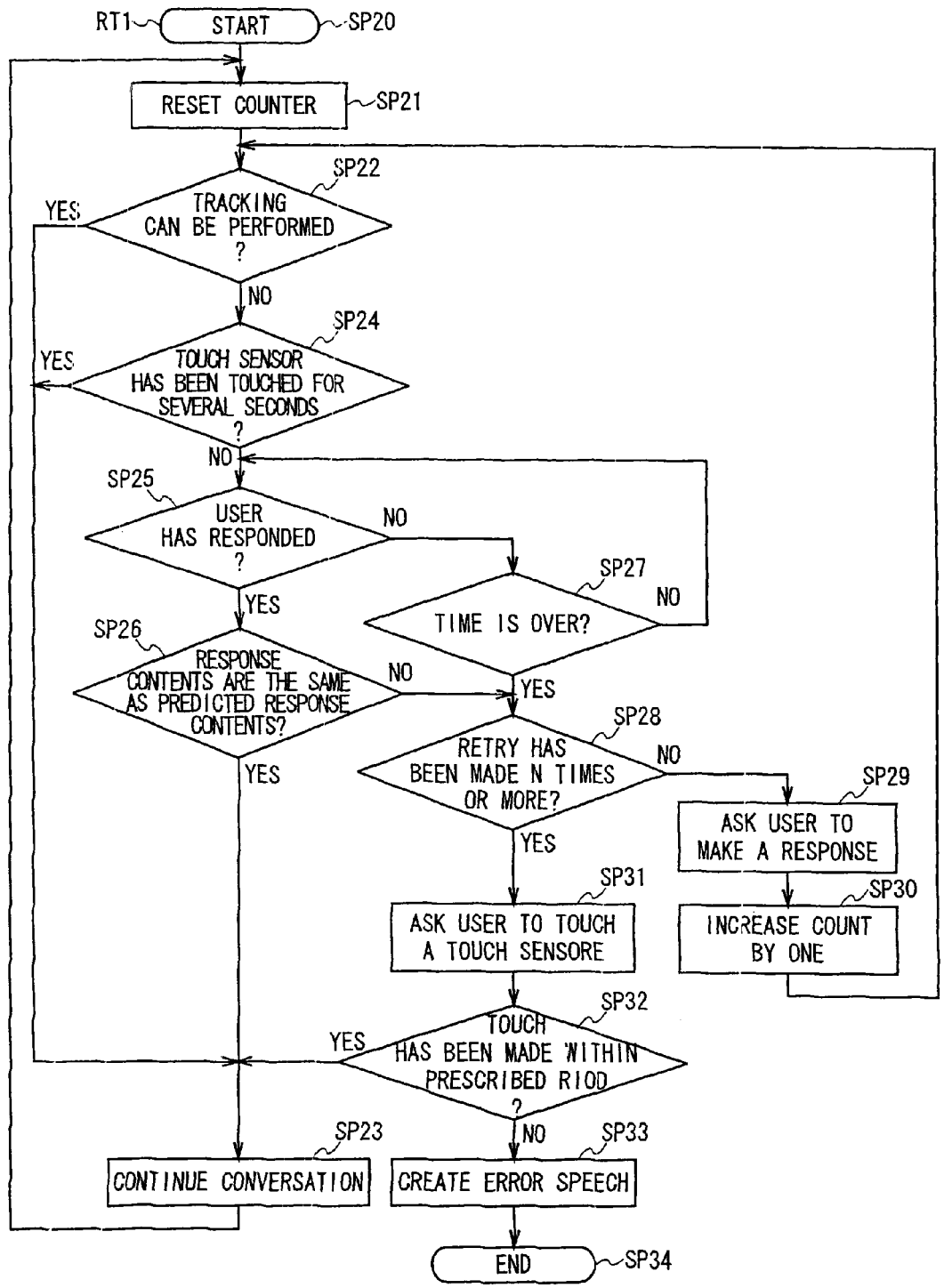
FIG. 8 is a flowchart explaining a conversation partner confirmation procedure.

When the robot 1 obtains user speech via the microphone 11, the control unit 2 starts the conversation partner confirmation procedure RT1 shown in FIG. 8 from step SP20. At next step SP21, the control unit 2 resets a counter (not shown) and then moves to step SP22 to determine whether the existence of the conversation partner can be tracked with the above-described tracking function.

When an affirmative result is obtained at step SP22, this means that the conversation partner is in front of the robot 1. In this case, the control unit 2 moves to step SP23 and returns to step SP21 to repeat the above-described processes while continuing conversation with the conversation partner.

When a negative result is obtained at step SP22, on the contrary, it means that the existence of the conversation partner has not been recognized. In this case, the control unit 2 moves to step SP24 to determine whether the touch sensor 13 has been touched for a several seconds (two to three seconds).

When an affirmative result is obtained at this step SP24, this means that the conversation partner is just in front of the robot 1. In this case, the control unit 2 moves to step SP23 and returns back to step SP21 to repeat the above-described processes while continuing the conversation with the conversation partner.

When a negative result is obtained at step SP24, on the contrary, this means that the existence of the conversation partner has not been recognized. In this case, the control unit 2 moves to step SP25 to start counting of a timer not shown and to determine whether the user has responded.

When an affirmative result is obtained at step SP25, this means that some speech is collected via the microphone 11. In this case, the control unit 2 moves to step SP26 to determine whether the contents of the collected speech are the same as predicted response contents.

When a negative result is obtained at step SP25, on the contrary, this means that any speech has not been collected via the microphone 11. In this case, the control unit 2 moves to step SP27 where it determines that a prescribed time (for example, 5 to 7 seconds) has elapsed since the timer started.

When an affirmative result is obtained at step SP27, the control unit 2 determines that the time is over and moves to step SP28. When a negative result is obtained, on the contrary, it determines that the time has not been over, and returns back to step SP25 and repeats the above processes.

When an affirmative result is obtained at step SP26, this means that the contents of the speech collected via the microphone 11 are the same as the predicted response contents. In this case, the control unit 2 determines that the conversation partner is just in front of the robot 1, and moves to step SP23 and returns back to step SP21 to repeat the above processes while continuing the conversation with the conversation partner.

When a negative result is obtained at step SP 26, on the contrary, this means that the contents of the speech collected via the microphone 11 are different from the predicted response contents. In this case, the control unit 2 determines that the existence of the conversation partner has not been recognized, and moves to step SP28.

In step SP28, the control unit 2 checks a numerical value of the counter which was reset at step SP21. When the value is less than N (N is a certain integer), the control unit 2 moves to step SP29, and moves to step SP30 while speaking to the user with the same intended contents to urge him/her to respond, increases the counter by one, and then returns back to step SP22 to repeat the above processes.

When the control unit 2 determines at step SP28 that the numerical value of the counter is N times or greater, the control unit 2 moves to step SP31 to ask the user to touch a touch sensor 13 and starts the counting of the timer, and then moves to step SP32.

At step SP32, the control unit 2 determines whether a touch sensor 13 has been touched within a prescribed period (for example, within five seconds) after starting to speak to the user. When an affirmative result is obtained, this means that the conversation partner is just in front of the robot 1. The control unit 2 moves to step SP22, returns back to step SP21 while continuing the conversation with the conversation partner, and repeats the above processes.

When a negative result is obtained at step SP32, this means that the existence of the conversation partner has not been confirmed for the prescribed period. In this case, the control unit 2 moves to step SP33 to create speech to end the conversation, and then moves to step SP34 to terminate the conversation partner confirmation procedure RT1.

As described above, the robot 1 is able to confirm the existence of the conversation partner while the tracking can be performed during conversation with the user. Therefore, if the conversation contents of the user are not the same as the predicted response contents, the robot 1 urges the user to respond to the robot 1 while continuing the conversation, thereby continuing the conversation with the user.

When the robot 1 receives user response "Uh . . . " in response to robot 1's question "What is Yukiko's favorite?", for example, the robot 1 creates a speech "Tell me Yukiko's favorite.". Then if the robot 1 receives "What?" from the user, it creates a speech "Please answer it is brabrabra", so as to receive user response such as "Apples".

Even if the robot 1 cannot perform tracking during conversation with the user, the robot 1 can determine that the user is in front of the robot 1 as the conversation partner when the user response to the robot 1's question is suitable for the question, and continues the conversation with the user.

For example, after the robot 1 creates a speech "What is Yukiko's favorite food?", when it can receive an expected response such as "Apples" from the user although it cannot track the existence of the user, the robot 1 determines that the user exists in front of the robot 1 and continues the conversation.

Further, in a case where the robot 1 cannot perform tracking during conversation with the user and it cannot receive expected responses or cannot recognize voice, the robot repeats asking speech a prescribed number of times. When the robot 1 cannot receive an expected response, it determines that the conversation partner has gone and can finish unnatural conversation.

For example, in a case where the robot 1 does not receive any response from a user for a prescribed period after the robot 1 creates a speech "what is Yukiko's favorite food?", and further, the robot 1 does not receive any response from the user for a prescribed period after making a speech "Tell me what Yukiko's favorite food is." having the same contents, the robot 1 is able to finish the unnatural conversation like self-speaking by creating speech "uh . . . has he gone?" ending the conversation.

(4) Operation and Effects of this Embodiment

In the above configuration, the robot 1 executes the conversation control function to have unique conversation with a user while performing the tracking function to track the existence of the user who is a conversation partner, based on the recognition results of the various kinds of recognition processes.

In this case, while the robot 1 can track the existence of the user during conversation with the user, it determines that it can confirm the existence of the conversation partner and urges the user to response to the robot 1 while continuing conversation, thus continuing natural conversation with the user like humans do.

When the robot 1 cannot track the existence of the user who is a conversation partner due to dark surroundings, only when user's conversation contents are the same as response contents expected by the robot 1, the robot 1 determines that the conversation partner exists in front of the robot 1 and continues the conversation with the user, thus making it possible to effectively prevent the robot 1 from determining by mistake that the user does not exist and stopping the conversation, regardless of the existence of the user in front of the robot 1.

Further, in a case where the robot 1 cannot perform tracking during conversation with the user and cannot receive response contents predicted by the robot 1, the robot 1 repeats urging the user to respond a prescribed number of times with the same conversation contents. When the robot 1 cannot receive expected response contents, it determines that the user has gone, and stops the conversation with the user. This prevents continuation of unnatural conversation like self-speaking. In addition, responses to noise such as television or radio can be previously avoided.

According to the above configuration, the robot 1 executes a conversation control function to have conversation about topics special to a user while executing a tracking function to track the existence of the user who is a conversation partner, based on the recognition results of various recognition processes, thereby comprehensively confirming the existence of the conversation partner without being affected by current environments. As a result, the robot is able to naturally make conversation like humans do, thus making it possible to significantly improve entertainment property.

(5) Other Embodiments

Note that the above-described embodiment has described a case where this invention is applied to an entertainment robot constructed as shown in FIG. 1 to FIG. 3. This invention, however, is not limited to this and can be widely applied to entertainment robots having other constructions and robots other than these, various devices other than robots, and other various conversation control apparatus capable of controlling conversation with users. In addition, this invention can be widely applied to various software such as software for TV games.

Further, the above-described embodiment has described a case where the impression levels of the items described with reference to FIG. 4 are determined at a time of obtaining the item values of the items, and are not updated thereafter. This invention is not limited to this and the impression levels can be updated. By doing this, the appearance frequency of a topic can be changed and conversation depending on the situation can be made, which can significantly improve entertainment property of the robot 1.

Still further, the above-described embodiment has described a case where the impression level of each item described with reference to FIG. 4 is calculated based on a difference between the parameter values of "affection" stored in the internal state management unit 34 before and after the item value of the item is obtained. This invention, however, is not limited to this and the level can be calculated based on the parameter value of another instinctive element or emotional element being stored in the internal state management unit 34, or can be calculated with another technique.

Still further, in the speech communication system with a function to communicate with a conversation partner according to the above-described embodiment, the speech recognition functional unit 32 is applied as a speech recognition means for recognizing conversation partner's speech, the visual recognition functional unit 31 is applied as an image recognition means for recognizing the conversation partner's face, and the contact recognition functional unit 33 is applied as a contact recognition means for recognizing contacts from the conversation partner. This invention, however, is not limited to this and various recognition means having other various constructions can be widely applied, provided that the voice, face and contact of a conversation partner can be recognized.

Still further, the above-described embodiment has described a case where the conversation control unit 38A of the state-depending action hierarchy 38 is applied as a conversation control means for controlling conversation with a conversation partner based on the recognition result of the speech recognition functional unit (speech recognition means) 32 under the control of the control unit 2. This invention, however, is not limited to this and other various constructions can be applied, provided that the conversation with the conversation partner can be controlled based on the speech recognition result obtained by recognizing conversation partner's speech.

Still further, the above-described embodiment has described a case where the tracking control unit 38B of the state-depending action hierarchy 38 is applied under the control of the control unit 2 as a tracking control means for tracking the existence of a conversation partner based on one or both of the recognition result of the visual recognition functional unit (image recognition means) 31 and the recognition result of the speech recognition functional unit (speech recognition means) 32. This invention, however, is not limited to this and other various configurations can be applied, provided that the conversation partner can be tracked based on one or both of the image recognition result obtained by recognizing a conversation partner's face and the speech recognition result obtained by recognizing the conversation partner's speech.

In this case, the tracking control unit (tracking control means) 38B can track the existence of the conversation partner based on a desired combination of the recognition result of the speech recognition functional unit (speech recognition means) 32, the recognition result of the visual recognition functional unit (image recognition means) 31, and the recognition result of the contact recognition functional unit (contact recognition functional unit) 33.

Still further, the above-described embodiment has described a case where, even when the tracking control unit (tracking control means) 38B cannot succeed tracking, the conversation control unit (conversation control means) 38A continues conversation when the speech contents of the conversation partner obtained as the recognition result of the speech recognition functional unit (speech recognition means) 32 are the same as expected response contents. This invention, however, is not limited to this and other various control methods can be applied, provided that conversation can be effectively prevented from being stopped, even in vary dark environments, when the robot 1 determines the conversation partner is not in front of the robot 1 regardless of the partner existing in front of the robot 1.

In this case, even when the tracking control unit (tracking control means) 38B cannot perform tracking, the conversation control unit (conversation control means) 38A continues conversation in a case where the contact of the conversation partner is confirmed as recognition result of the contact recognition functional unit (contact recognition means) 33, resulting in obtaining the same effects as described above.

Still further, the above-described embodiment has described a case where, even when the tracking control unit (tracking control means) 38B cannot perform tracking, and the speech contents of the conversation partner are not the same as expected response contents, and the response contents cannot be obtained from the conversation partner after a speech to urge the conversation partner to respond is made a prescribed number of times, the conversation control unit (conversation control means) 38A finishes the conversation. This invention, however, is not limited to this and other various control methods can be applied, provided that, in a case where a robot cannot obtain an expected response even if the robot repeatedly urges the conversation partner to respond, unnatural conversation like self-talking can be prevented from continuing when the conversation partner has gone.

In this case, in a case where the tracking control unit (tracking control means) 38B cannot perform tracking and the speech contents of the conversation partner are not the same as expected response contents, and if the response contents from the conversation partner cannot be obtained after a speech to urge the conversation partner to respond is made a prescribed number of times, the conversation control unit (conversation control means) 38A asks the conversation partner to touch the contact recognition functional unit (contact recognition means) 33 just before ending the conversation, and then in a case where the contact recognition functional unit (contact recognition means) 33 recognizes the contact of the conversation partner as the recognition result, the conversation control unit (conversation control means) 38A continues the conversation, thereby also resulting in obtaining the same effects as described above.

Still further, the above-described embodiment has described a case where the conversation control unit (conversation control means) 38A sets a timeout as well as urging the conversation partner to respond when the conversation partner's speech cannot be obtained for a prescribed time. This timeout can be set, as desired, to a desired time as a time for waiting for expected response contents.

A speech communication system and method, and a robot apparatus can be applied to amusement robots, caring robots, etc.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A speech communication system enabling a conversation with a conversation partner, comprising:
   a microprocessor;
   a speech recognition unit configured to recognize a speech content of the conversation partner;
   a speech processing unit configured to generate a response based on the speech content recognized by the speech recognition unit;
   an audio output unit configured to output auditory communications corresponding to the response generated by the speech processing unit;
   a touch sensing unit configured to recognize a touch input by the conversation partner;
   a control unit configured to determine whether or not to continue the conversation based on a recognition result from the touch sensing unit; and
   a network interface configured to communicate with an external network.

2. The speech communication system according to claim 1, wherein the speech processing unit is further configured to generate the response based on a conversation history with the conversation partner.

3. The speech communication system according to claim 2, wherein the control unit is further configured to determine whether or not to continue the conversation based on a recognition result from the touch sensing unit and the image capturing unit.

4. The speech communication system according to claim 2, further comprising:
   a camera; and
   a microphone.

5. The speech communication system according to claim 2, wherein the speech communication apparatus implements a game function.

6. The speech communication system according to claim 2, wherein the network interface is configured to receive, via the external network, information generated as a result of calculations performed at a device which is remote to the network interface.

7. The speech communication system according to claim 6, wherein the calculations performed at the device are performed based on input from the speech recognition unit.

8. The speech communication system according to claim 2, wherein the network interface is a wireless network interface.

9. The speech communication system according to claim 2, wherein the external network is the Internet.

10. The speech communication system according to claim 2, wherein a conversation partner speech utterance is accepted in response to the touch sensing unit recognizing the touch input by the conversation partner.

11. The speech communication system according to claim 10, wherein auditory communications output by the audio output unit are generated based on the input conversation partner speech utterance.

12. The speech communication apparatus according to claim 2, wherein conversation history with the conversation partner includes a previous conversation partner speech utterance which was recognized by the speech recognition unit.

13. A speech communication apparatus enabling a conversation with a conversation partner, comprising:
   a microprocessor;
   a speech input unit configured to input a speech content of the conversation partner;
   an audio output unit configured to output auditory communications based on a conversation history with the conversation partner;
   an image capturing unit configured to capture a face of the conversation partner;
   a touch sensing unit configured to recognize a touch input by the conversation partner;
   a control unit configured to determine whether or not to continue the conversation based on a recognition result from the touch sensing unit; and
   a network interface configured to communicate with an external network.

14. The speech communication apparatus according to claim 13, wherein the control unit is further configured to determine whether or not to continue the conversation based on a recognition result from the touch sensing unit and the image capturing unit.

15. The speech communication apparatus according to claim 13, further comprising:
   a camera; and
   a microphone.

16. The speech communication apparatus according to claim 13, wherein the speech communication apparatus implements a game function.

17. The speech communication apparatus according to claim 13, wherein the network interface is configured to receive, via the external network, information generated as a result of calculations performed at a device which is remote to the speech communication apparatus.

18. The speech communication apparatus according to claim 17, wherein the calculations performed at the device which is remote to the speech communication apparatus are performed based on input from the speech communication apparatus.

19. The speech communication apparatus according to claim 13, wherein the network interface is a wireless network interface.

20. The speech communication apparatus according to claim 13, wherein the external network is the Internet.

21. The speech communication apparatus according to claim 13, wherein a conversation partner speech utterance is accepted in response to the touch sensing unit recognizing the touch input by the conversation partner.

22. The speech communication apparatus according to claim 21, wherein auditory communications output by the audio output unit are generated based on the input conversation partner speech utterance.

23. The speech communication apparatus according to claim 13, wherein conversation history with the conversation partner includes a previous conversation partner speech utterance which was recognized by the speech recognition unit.

24. A speech communication apparatus enabling a conversation with a conversation partner, comprising:
   a microprocessor;
   a speech recognition unit configured to recognize a speech content of the conversation partner;
   an audio output unit configured to output auditory communications;
   a touch sensing unit configured to recognize a touch input by the conversation partner;

a control unit configured to determine whether or not to continue the conversation based on a recognition result from the touch sensing unit; and a network interface configured to communicate with an external network.

25. The speech communication apparatus according to claim 24, wherein the audio output unit is further configured to output auditory communications based on a conversation history with the conversation partner.

26. The speech communication apparatus according to claim 25, wherein the control unit is further configured to determine whether or not to continue the conversation based on a recognition result from the touch sensing unit and the image capturing unit.

27. The speech communication apparatus according to claim 25, further comprising:
   a camera; and
   a microphone.

28. The speech communication apparatus according to claim 25, wherein the speech communication apparatus implements a game function.

29. The speech communication apparatus according to claim 25, wherein the network interface is configured to receive, via the external network, information generated as a result of calculations performed at a device which is remote to the speech communication apparatus.

30. The speech communication apparatus according to claim 29, wherein the calculations performed at the device which is remote to the speech communication apparatus are performed based on input from the speech communication apparatus.

31. The speech communication apparatus according to claim 25, wherein the network interface is a wireless network interface.

32. The speech communication apparatus according to claim 25, wherein the external network is the Internet.

33. The speech communication apparatus according to claim 25, wherein a conversation partner speech utterance is accepted in response to the touch sensing unit recognizing the touch input by the conversation partner.

34. The speech communication apparatus according to claim 33, wherein auditory communications output by the audio output unit are generated based on the input conversation partner speech utterance.

35. The speech communication apparatus according to claim 25, wherein conversation history with the conversation partner includes a previous conversation partner speech utterance which was recognized by the speech recognition unit.

36. A non-transitory computer readable medium having stored thereon a program that when executed by a computer causes the computer to implement a speech communication system enabling a conversation with a conversation partner, comprising:

a speech recognition unit configured to recognize a speech content of the conversation partner;

a speech processing unit configured to generate a response based on the speech content recognized by the speech recognition unit;

an audio output unit configured to output auditory communications corresponding to the response generated by the speech processing unit;

a touch sensing unit configured to recognize a touch input by the conversation partner;

a control unit configured to determine whether or not to continue the conversation based on a recognition result from the touch sensing unit; and a network interface unit configured to communicate with an external network.

37. The non-transitory computer readable medium according to claim 36, wherein the speech processing unit is further configured to generate the response based on a conversation history with the conversation partner.

38. The non-transitory computer readable medium according to claim 37, wherein the control unit is further configured to determine whether or not to continue the conversation based on a recognition result from the touch sensing unit and the image capturing unit.

39. The non-transitory computer readable medium according to claim 37, wherein the network interface unit is configured to receive, via the external network, information generated as a result of calculations performed at a remote device.

40. The non-transitory computer readable medium according to claim 39, wherein the calculations performed at the remote device are performed based on input from the speech recognition unit.

41. The non-transitory computer readable medium according to claim 37, wherein the network interface unit implements a wireless networking interface.

42. The non-transitory computer readable medium according to claim 37, wherein the external network is the Internet.

43. The non-transitory computer readable medium according to claim 37, wherein a conversation partner speech utterance is accepted in response to the touch sensing unit recognizing the touch input by the conversation partner.

44. The non-transitory computer readable medium according to claim 43, wherein auditory communications output by the audio output unit are generated based on the input conversation partner speech utterance.

45. The non-transitory computer readable medium according to claim 37, wherein conversation history with the conversation partner includes a previous conversation partner speech utterance which was recognized by the speech recognition unit.

* * * * *